June 17, 1952     L. G. SAYWELL     2,600,433
BEARING ASSEMBLY AND SEAL
Filed Dec. 4, 1948     2 SHEETS—SHEET 1
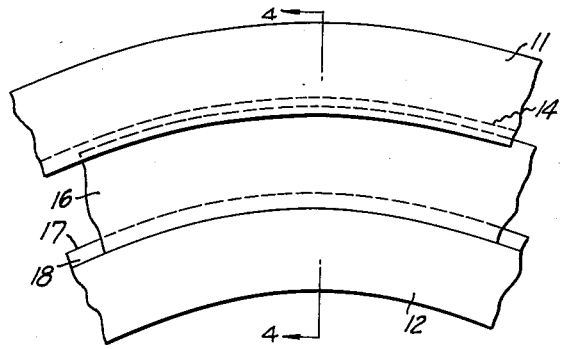
FIG_1_
FIG_2_
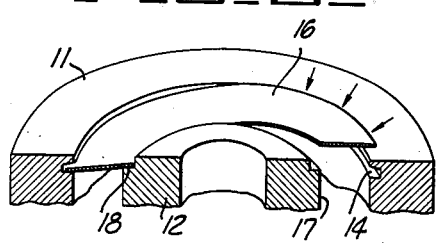
FIG_3_
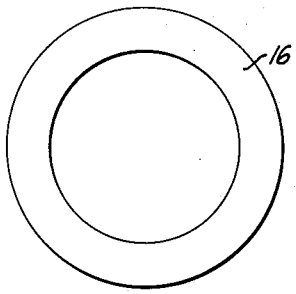
FIG_4_
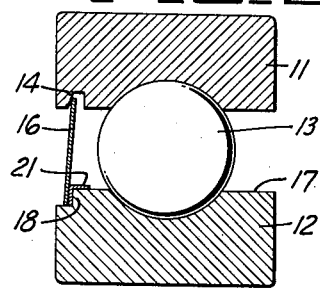
FIG_6_
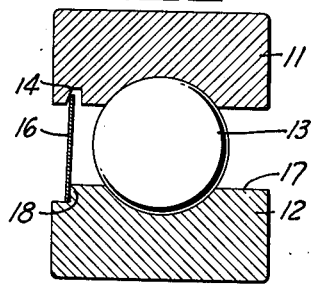
FIG_5_
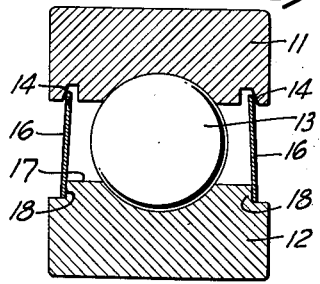
FIG_7_
INVENTOR.
Lawrence G. Saywell
BY
ATTORNEYS June 17, 1952 — L. G. SAYWELL — 2,600,433
BEARING ASSEMBLY AND SEAL
Filed Dec. 4, 1948 — 2 SHEETS—SHEET 2
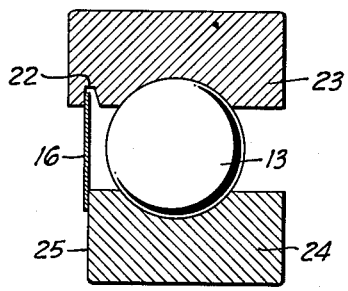
FIG_8_
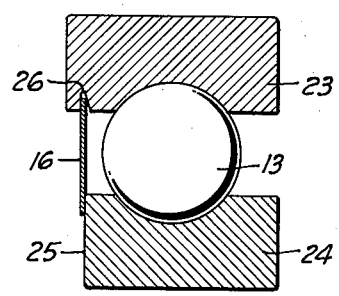
FIG_9_
FIG_10_
FIG_11_
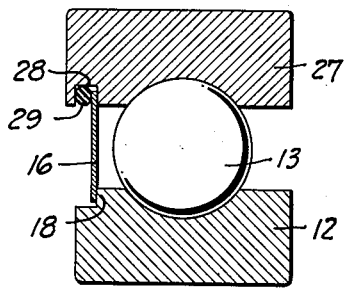
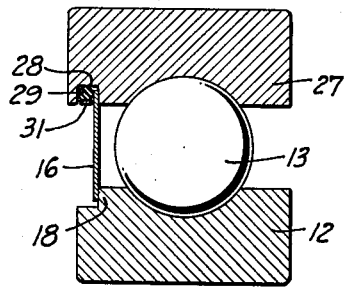
INVENTOR
Lawrence G. Saywell
BY
ATTORNEYS Patented June 17, 1952

2,600,433

UNITED STATES PATENT OFFICE 2,600,433

BEARING ASSEMBLY AND SEAL

Lawrence G. Saywell, San Mateo, Calif., assignor to Saywell Associates, San Francisco, Calif., a joint venture Application December 4, 1948, Serial No. 63,579

2 Claims. (Cl. 308—187.2)

This invention relates generally to ball or roller bearing assemblies such as are provided with built-in lubricant seals.

In the past it has been common to provide ball or roller bearing assemblies with lubricant seals built in at the factory, and which serve to prevent loss of lubricant. One of the more common types of such sealing assemblies makes use of a felt sealing washer which is carried by one end of the outer race, and which extends into sealing contact with the outer periphery of the inner race. Seals of this type are subject to many limitations and difficulties. They are not capable of withstanding relatively high speeds of rotation, and even for moderate speeds, their useful life is not long. Cost of manufacture is considerable compared to the present invention, and it is troublesome and difficult to replace the seal after it has become worn or damaged.

It is an object of the present invention to provide a lubricant seal for a ball or roller bearing assembly which will be characterized by utmost simplicity, and which will have a long useful life.

Another object of the invention is to provide a seal of the above character which is well adapted for relatively high rotative speeds.

Another object of the invention is to provide a seal of the above character which can be readily installed at the factory, and which can be easily removed and replaced.

Additional objects of the invention will appear from the following description in which the preferred embodiments have been set forth in detail in conjunction with the accompanying drawing.

Referring to the drawing:

Figure 1 is a fragmentary side elevational view illustrating a complete ball bearing assembly incorporating the present invention.

Figure 2 is a side elevational view showing a spring annulus such as is used in connection with the present invention.

Figure 3 is a perspective view illustrating the manner in which the annulus of Figure 2 is installed in a ball bearing assembly.

Figure 4 is a cross-sectional view taken along the line 4—4 of Figure 1.

Figure 5 is a view like Figure 4, but showing another embodiment of the invention.

Figure 6 is a view like Figure 4, but showing another embodiment of the invention.

Figure 7 is a view like Figure 4, but showing another embodiment of the invention.

Figures 8 to 11 inclusive are cross-sectional details like Figure 4 but showing additional embodiments of the invention.

Referring first to Figures 1 and 4 of the drawing, I have shown a ball bearing assembly comprising the outer and inner annular ball bearing races 11 and 12, together with the balls 13. As is well known such an assembly may include a suitable ball retaining cage. The outer race 11 adjacent one end thereof is shown provided with an annular groove 14, the side walls of which may be slightly divergent, as illustrated. This groove may be similar in location and dimensioning to grooves now commonly used in connection with ball bearing assemblies for the mounting of lubricant seals of the felt washer type. The inner race 12 is provided with a flat end face 18.

A substantially flat annulus 16 has its outer peripheral edge portion loosely accommodated within the groove 14. The inner periphery of the annulus 16 is dimensioned whereby it overlaps the adjacent inner peripheral edge portion of the annulus.

The annulus 16 by itself is illustrated in Figure 3. It is preferably formed of relatively thin and readily bendable spring material, such as relatively thin spring metal which can be distorted to a substantial extent from normal substantially flat form without permanent deformation. For example I can use suitable spring metals such as high carbon steel, Phosphor bronze, and various stainless steels. The sheet metal used may for example range in thickness from .003 to .005 inch, and in typical instances good results have been secured by using high carbon steel sheet metal having a thickness of .003 inch. The outer diameter of the annulus 16 should be greater than the inner diameter of the race 11, adjacent the groove 14, and preferably slightly less than the outer or root diameter of the groove 14.

The manner in which the substantially flat annulus of Figure 2 is inserted in the ball bearing assembly is illustrated in Figure 3. The outer edge portion of the annulus, extending over roughly one-half of the circumference, is first placed into the groove 14 in the manner illustrated in Figure 3. This will require some bending or distortion of the annulus. Then by manually applying force to the remaining circumference of the annulus, as indicated by the arrows in Figure 3, the ring is distorted with some dishing to enable snapping in the remaining edge of the annulus into the groove 14. After the outer edge of the annulus has been completely positioned in the groove 14, the annulus springs back to substantially its initial planar form.

The location of the groove 14 relative to the face 18 is such that after the annulus has been snapped into the groove its engagement with face 18 causes it to be stressed laterally, thus yieldably urging its inner peripheral edge portion into sealing engagement with the face 18, and likewise yieldably urging its outer peripheral edge portion into sealing engagement with the outer wall of the groove 14 as illustrated. Such sealing engagement will be maintained irrespective of slight relative longitudinal movement between the inner and outer races of the assembly.

The seal of Figure 1 will serve to provide an effective seal against leakage of lubricant, including various types of greases. Normally relative rotation takes place between the inner race 12 and the annulus 16, although if there should be any abnormal binding between the annulus 16 and the cylindrical surface 17, then the annulus may turn relative to the outer race 11. An assembly of this type is capable of operating over long periods of time without excessive wear, and in particular it is capable of operation at relatively high speeds of rotation.

If one should wish to replace the annulus 16 because of excessive wear, this can be readily done by inserting a suitable tool into the groove 14 to engage the outer edge of the annulus, after which the annulus can be distorted and withdrawn.

To cite a specific example of a seal such as described above, race 11 had an inner diameter of 2.118 inches, and race 12 an outer diameter of 1.453 inches. The groove 14 was .050 inch deep, thus providing a root diameter of 2.218 inches. Annulus 16 was made out of high carbon steel, with a thickness of .003 inch, an outside diameter of 2.211 inches and an inside diameter such as to overlap substantially the entire radial extent of face 18. Such an annulus could be readily snapped into the groove 14 in the manner described above, and served to form an effective grease seal.

It will be evident that the lateral stressing of the annulus 16 as described above, in the embodiment of Figure 4, serves to normally distort it into a slightly dished form. The requisite amount of lateral stressing alternately can be secured by initially manufacturing the annulus in slightly dished form, whereby upon being installed in the bearing assembly it is stressed by engagement with the groove 14 and the shoulder 18 in a direction opposite to the applied dishing. Thus after installation such an annulus will be of substantially planar form.

Figure 5 illustrates another embodiment which is similar to Figure 4. In addition to the single annulus 16 this embodiment makes use of an additional liner annulus 19. The liner 19 can be made of such materials as a phenolic condensate product or like nonmetallic plastic, or a synthetic rubber of sufficient inherent strength. Where this annulus has sufficient inherent strength it may be formed as a separable part, although where more resilient materials such as synthetic rubber are employed it may be bonded to the inner face of the annulus 16. Such an annulus can serve to aid in securing a good seal against the annular shoulder 18, with a minimum amount of friction.

Figure 6 illustrates another embodiment of the invention which is similar to Figure 4, except that in this instance a special facing ring 21 is mounted upon the shoulder 18. This facing ring can be of L cross-sectional contour as illustrated, and it may be pressed or otherwise mounted upon the shoulder 18, in order to provide a fluid seal between itself and the body of the race 12. The facing 21 can be made of material which will form a good seal with the inner peripheral edge portion of the annulus 16, with a minimum amount of friction. For example it can be made of various types of bearing metals having low coefficients of friction, or it may be a composite bearing material of the type disclosed and claimed in my co-pending application Serial No. 39,822, filed July 20, 1948 now Patent No. 2,581,301.

As shown in Figure 7, the ball bearing assembly can be equipped with seals of the type described above upon both sides of the balls. Such an arrangement is illustrated in Figure 7. An assembly of this type can be provided with lubricant at the factory, as is desirable for use with many types of appliances.

As shown in Figure 8, the groove 22 in the outer race 23 has an outer plane or side against which the annulus 16 can contact as illustrated. The inner race 24 in this instance has a simple end face 25 against which the inner edge portion of annulus 16 is pressed.

In place of a loose fit between the annulus and the groove in the outer race, the outer race may have a groove dimensioned to snugly receive the annulus. Thus as in Figure 9 the outer groove 26 is dimensioned to snugly receive the annulus 16, and the annulus is laterally stressed in the same manner as in Figures 4 to 7 inclusive.

In Figures 10 and 11 sealing means is provided for sealing the outer edge of the annulus with respect to the outer race. Thus the outer race 27 in this instance is provided with a groove 28 having straight parallel side walls and dimensioned to accommodate the O ring 29. The O ring can be made of suitable resilient material such as oil resistant synthetic rubber. In Figure 12 and O ring is positively held in the groove by the retainer ring 31 which may be continuous or split. The O ring should be dimensioned so that it is normally compressed to form a seal against the adjacent face of the annulus 16 and the opposed wall face of the groove 28.

It will be evident from the foregoing that my invention is of extreme simplicity, and it can be incorporated in a ball or roller bearing assembly with a minimum amount of labor. In many respects it is more satisfactory than conventional seals making use of felt washers, and in particular it can be used for the higher speeds of rotation without excessive wear. When installed in the bearing assembly it occupies a minimum amount of space, and therefore it facilitates the design of bearing assemblies with a minimum of over-all dimensioning.

In the foregoing the invention has been described particularly in connection with a ball bearing assembly of the type commonly used to journal shafts. It will be evident that the invention is applicable to roller and needle type bearings, and likewise to ball or roller bearing assemblies of the thrust type.

I claim:

1. In combination with a ball or roller bearing assembly of the type having inner and outer annular metal races, the outer race having a radially inwardly facing annular groove adjacent one end of the same, a single normally substantially flat and continuous annulus of spring metal having an outer diameter greater than the inner diameter of the outer race and having its outer edge portion accommodated in said groove, an annular end face formed on the inner race, said annulus when assembled in said bearing being stressed laterally within its elastic limit whereby the resiliency thereof causes one face thereof at its inner peripheral edge portion to be resiliently urged in sealing engagement with said end face and its outer peripheral edge, in said groove, to be held against means engaging the peripheral face thereof opposite said one face and in sealing engagement therewith to prevent stress-relieving axial movement, said annulus being distortable within its elastic limit from its normal substantially flat form to a form in which it may be readily inserted in said groove.

2. A combination as in claim 1 in which a liner is interposed between the annulus and said end face to facilitate establishing a seal between such parts.

LAWRENCE G. SAYWELL.

REFERENCES CITED

The following references are of record in the file of this patent:

UNITED STATES PATENTS

| Number | Name | Date |
|---|---|---|
| 1,337,597 | Gilbert | Apr. 20, 1920 |
| 1,722,488 | Bott et al. | July 30, 1929 |
| 1,762,819 | Hughes | June 10, 1930 |
| 1,888,361 | Robinson | Nov. 22, 1932 |
| 1,903,217 | Hodge | Mar. 28, 1933 |
| 2,009,281 | Stein | July 23, 1935 |
| 2,031,571 | Nilsson | Feb. 18, 1936 |
| 2,040,489 | Large | May 12, 1936 |
| 2,197,748 | Betz | Apr. 16, 1940 |
| 2,221,554 | Okun | Nov. 12, 1940 |
| 2,281,010 | Reynolds | Apr. 28, 1942 |

FOREIGN PATENTS

| Number | Country | Date |
|---|---|---|
| 30,487 | Great Britain | 1909 |
| 851,424 | France | Jan. 9, 1940 |